(12) United States Patent
Mizuno et al.

(10) Patent No.: US 9,918,153 B2
(45) Date of Patent: Mar. 13, 2018

(54) MOBILE TERMINAL

(71) Applicant: KYOCERA CORPORATION, Kyoto (JP)

(72) Inventors: Hayato Mizuno, Daito (JP); Kotaro Nakamura, Osaka (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/274,886

(22) Filed: Sep. 23, 2016

(65) Prior Publication Data

US 2017/0013333 A1    Jan. 12, 2017

Related U.S. Application Data

(63) Continuation of application No. PCT/JP2015/059436, filed on Mar. 26, 2015.

(30) Foreign Application Priority Data

Mar. 26, 2014 (JP) .................. 2014-062929

(51) Int. Cl.
*H04R 1/02* (2006.01)
*H04M 1/03* (2006.01)
*H04R 7/16* (2006.01)
*H04R 17/00* (2006.01)
*H04R 7/18* (2006.01)

(52) U.S. Cl.
CPC .............. *H04R 1/025* (2013.01); *H04M 1/03* (2013.01); *H04R 7/16* (2013.01); *H04R 7/18* (2013.01); *H04R 17/00* (2013.01); *H04R 2499/11* (2013.01)

(58) Field of Classification Search
USPC ....... 381/85, 89, 91, 92, 188, 334, 335, 386, 381/186, 336, 114, 173, 190
See application file for complete search history.

(56) References Cited

U.S. PATENT DOCUMENTS 6,554,098 B1 *  4/2003  Komura .................. H04R 1/02
                                                    181/173

FOREIGN PATENT DOCUMENTS

JP      2012-227836 A    11/2012
JP         2012227836    * 11/2012    .............. H04M 1/02

* cited by examiner

*Primary Examiner* — Yosef K Laekemariam
(74) *Attorney, Agent, or Firm* — Duane Morris LLP (57) ABSTRACT

A mobile terminal according to the present disclosure includes a housing member with a first sound hole, a film speaker and a speaker holder with a second sound hole. The film speaker includes a piezoelectric element and a resin film configured to vibrate with the piezoelectric element. The film speaker is located in the speaker holder. The second sound hole corresponds to the first sound hole and is located between the first sound hole and the film speaker. An inner edge which defines the second sound hole extends above the film speaker. A surface of the inner edge facing the film speaker is inclined such that at least a part of the inner edge decreases in thickness toward a leading end of the inner edge.

8 Claims, 10 Drawing Sheets

MOBILE TERMINAL

CROSS-REFERENCE TO RELATED APPLICATION

The present application is a continuation based on PCT Application No. PCT/JP2015/059436 filed on Mar. 26, 2015, which claims the benefit of Japanese Application No. 2014-062929, filed on Mar. 26, 2014. PCT Application No. PCT/JP2015/059436 is entitled "Portable Terminal", and Japanese Application No. 2014-062929 is entitled "Mobile Terminal." The content of which are incorporated by reference herein in their entirety.

FIELD

Embodiments of the present disclosure relate to mobile terminals, and more particularly relate to a mobile terminal with a speaker built therein.

BACKGROUND

Reductions in size and thickness of mobile terminal devices have conventionally been achieved by locating a speaker at a corner of a housing at any angle.

SUMMARY

A mobile terminal according to the present disclosure includes a housing member with a first sound hole, a film speaker and a speaker holder with a second sound hole. The film speaker includes a piezoelectric element and a resin film configured to vibrate with the piezoelectric element. The film speaker is located in the speaker holder. The second sound hole corresponds to the first sound hole and is located between the first sound hole and the film speaker. An inner edge which defines the second sound hole extends above the film speaker. A surface of the inner edge facing the film speaker is inclined such that at least a part of the inner edge decreases in thickness toward a leading end of the inner edge.

The foregoing and other objects, features, aspects and advantages of the present disclosure will become more apparent from the following detailed description of the present disclosure when taken in conjunction with the accompanying drawings.

DETAILED DESCRIPTION

In the recent development of mobile terminals, ensuring space in a housing is an issue with a size increase of a secondary battery and the like. To address the issue, it is conceivable to devise the location of a dynamic speaker. If a dynamic speaker is located at a corner of the housing, the thickness of a mobile terminal device is determined by the size of the dynamic speaker, which may increase the entire thickness.

Hereinafter, an embodiment of the present disclosure in which film speakers are employed to reduce the entire thickness of a mobile phone will be described.

Figure 1:
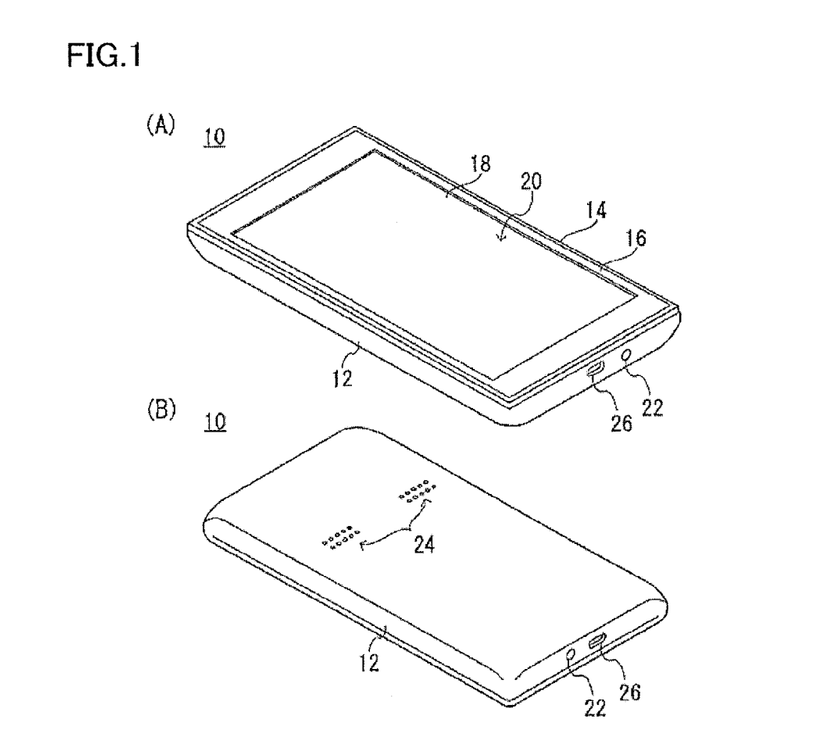
FIG. 1 is an external view of an example showing the appearance of a mobile phone according to an embodiment of the present disclosure, where (A) shows the appearance of the front surface of the mobile phone, and (B) shows the appearance of the back surface of the mobile phone.

Referring to (A) and (B) in FIG. 1, a mobile phone 10 of an embodiment is a Smartphone as an example, and the appearance thereof may include a back panel 12, a part of an attachment frame 14 and a front panel 16 so as to present a lengthwise flat rectangle. Back panel 12 includes a main housing member (a member for making up a housing having a principal surface and side surfaces). The part of attachment frame 14 or front panel 16 may serve as the side surfaces of the housing member. It is pointed out in advance that the characteristics of the present disclosure are applicable not only to Smartphones but also any mobile terminals, such as a tablet PC (Personal Computer) and a PDA (Personal Digital Assistant).

A touch panel 20 may be integral with front panel 16. A display 18 including, for example, a liquid crystal, organic electroluminescence or the like may have been affixed to the back surface of front panel 16.

A hole 22 through which voice is to be input to a microphone located in the inside may be positioned on a rightward side in a lower surface of mobile phone 10. A piezoelectric element (not shown) which converts sound into vibrations may have been built in the principal surface on the upper side of mobile phone 10. For example, when a sound signal is input to the piezoelectric element, the piezoelectric element can convert the sound signal into vibrations to directly vibrate display 18 (front panel 16). A user can hear sound output from display 18. Since sound is output in this manner, a sound hole through which received voice, for example, is to be output is not indispensable.

A first film speaker 30a (described later) and a second film speaker 30b (described later) may have been built into mobile phone 10 on the back side. Sound from first film speaker 30a and second film speaker 30b may be output through first sound holes 24 in the back surface of back panel 12 in an embodiment.

A hole 26 communicating with a charging terminal (not shown) located in the inside may be positioned at the center of the lower surface of mobile phone 10.

For example, when an operation for making a phone call is performed and a voice call is started, received voice may be output from front panel 16 by vibrations of the above-described piezoelectric element built in the principal surface on the upper side. User's uttered voice may be input to the microphone through hole 22, and may be transmitted to a phone device of the other party. When an incoming call from another phone device is notified, a ring tone may be output from a built-in film speaker. Since mobile phone 10 of an embodiment includes built-in first film speaker 30a and second film speaker 30b, it is also possible to play back stereo sound.

If a charging connector is connected to the charging terminal through hole 26, electric power for charging may be supplied to a secondary battery 44 (see FIG. 3) of mobile phone 10 from an external power source.

Figure 2A:
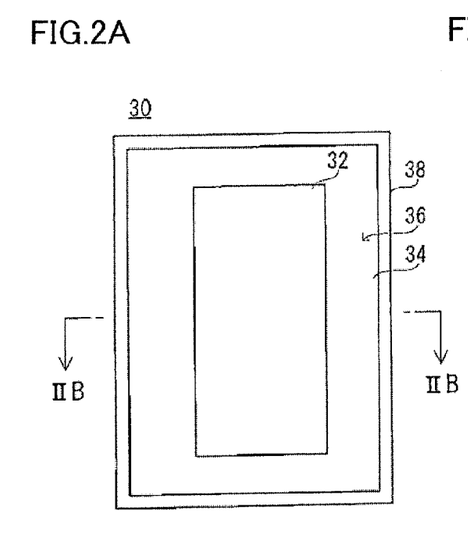
FIG. 2A illustrates an example of the structure of a film speaker built in the mobile phone shown in FIG. 1, showing an example of the appearance of the film speaker as seen from the front surface.
Figure 2B:
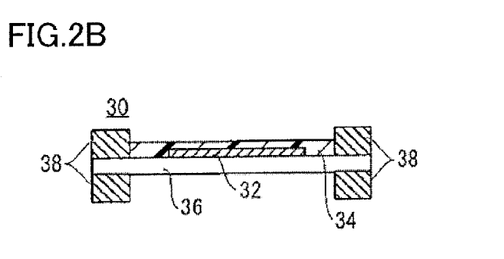
FIG. 2B illustrates an example of the structure of the film speaker built in the mobile phone shown in FIG. 1, showing an example of a cross section taken along the line IIB-IIB shown in FIG. 2A.

FIG. 2A illustrates the appearance of film speaker 30 for use in an embodiment as seen from the front surface. FIG. 2B shows a cross section taken along the line IIB-IIB shown in FIG. 2A. Since film speaker 30 shown in this drawing is used as first film speaker 30a and second film speaker 30b built in mobile phone 10, description will be made here without distinguishing between the first and second film speakers, and when distinguishing them, reference numbers 30a and 30b will be used.

Film speaker 30 may be a flat rectangle, and may have a thickness of 0.7 mm, for example. Film speaker 30 may include a piezoelectric element 32 made of ceramic which is similarly rectangular. Piezoelectric element 32 may have been coated with resin by a resin coating layer 34 so as to be positioned approximately at the center on the front surface (FIG. 2A) from which sound is output. A resin film 36 may have been affixed to the front surface of resin coating layer 34. In order to support them, a frame 38 may have been attached to the periphery of film speaker 30. When a sound signal is supplied to piezoelectric element 32 of film speaker 30, piezoelectric element 32 may vibrate. The vibrations may propagate to entire film speaker 30 including resin coating layer 34 and resin film 36, and sound may be output from the front surface of film speaker 30. Frame 38 may be used when fixing film speaker 30 onto a speaker holder 46 (described later).

Figure 3:
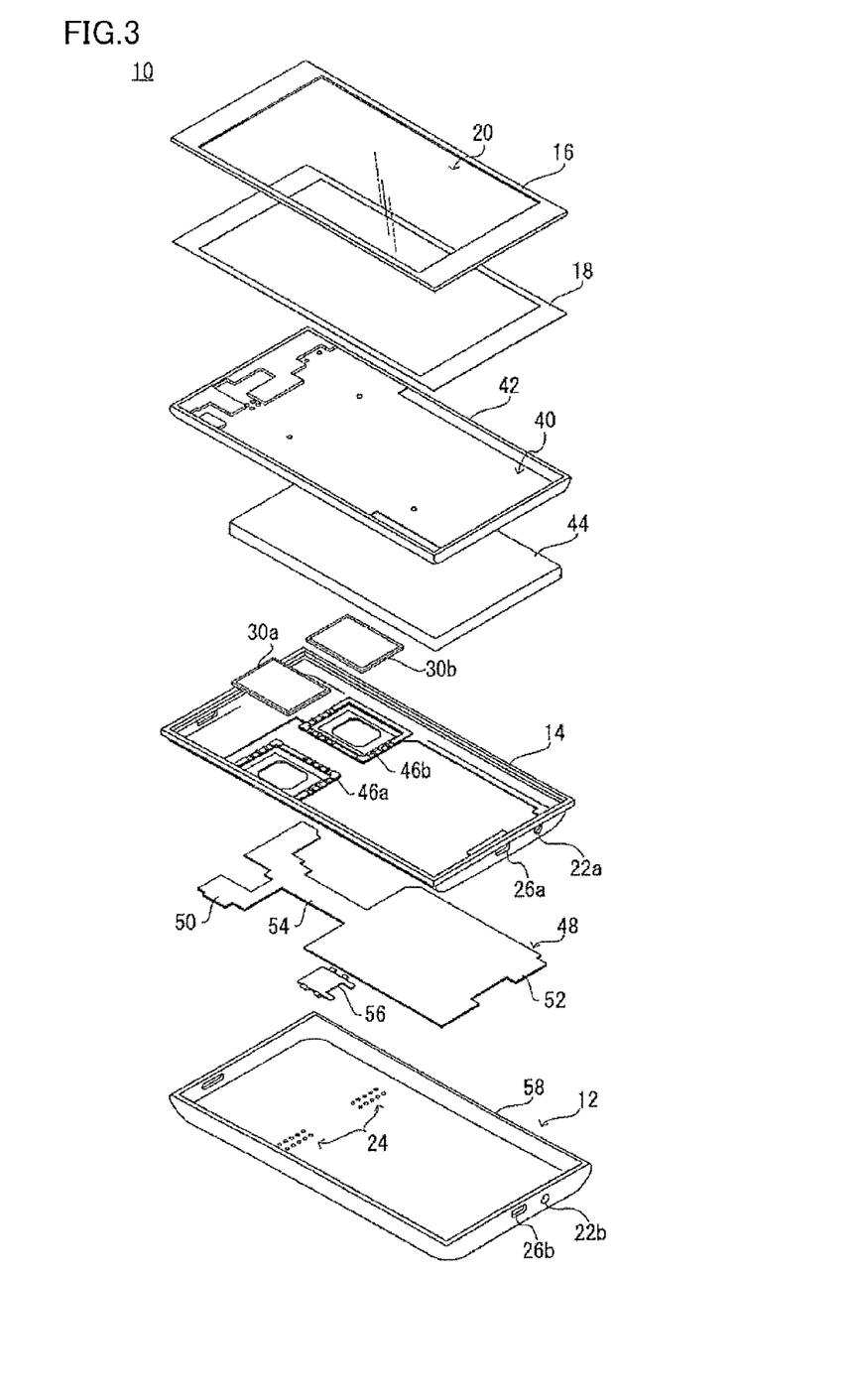
FIG. 3 is an exploded perspective view showing an example of the overview of the internal structure of the mobile phone shown in FIG. 1.

FIG. 3 is an exploded perspective view showing the overview of the internal structure of mobile phone 10. Referring to FIG. 3, in mobile phone 10, respective parts are attached in the order of front panel 16, display 18, an inner chassis 42, secondary battery 44, first film speaker 30a and second film speaker 30b, attachment frame 14, a substrate 48, a coupling member 56, and back panel 12 from the front surface side (from the upper side in FIG. 3). Attached back panel 12 cooperates with attachment frame 14 to create closed space on the inner side of back panel 12, and sound from first film speaker 30a and second film speaker 30b may be emitted out of the closed space through first sound holes 24 and second sound holes 74 (see (A) in FIG. 4).

Front panel 16 constitutes the principal surface of mobile phone 10, and may be made of glass so as to present a lengthwise flat rectangle, for example. Touch panel 20 may be integral with the back surface of front panel 16. Display 18 may have been bonded to the back surface of front panel 16 with an adhesive or an OCA (Optical Clear Adhesive: transparent adhesive) tape.

Inner chassis 42 includes a rectangular resin frame. A shield plate 40 made of metal (a conductive material) may be located within the frame so as to cover almost the entire surface. The frame of inner chassis 42 may have a thickness equal to or slightly thinner than the stacked thickness of shield plate 40 and secondary battery 44. Front panel 16 with display 18 affixed thereto as described above may be located on the front side of inner chassis 42 (front side of shield plate 40). A recess (not shown) for holding secondary battery 44 (within which secondary battery 44 is to be fitted) may be located on the back side of inner chassis 42. Secondary battery 44 may be located on the back side of display 18 with shield plate 40 interposed therebetween. Secondary battery 44 may be stably held by inner chassis 42 on the back side of display 18. Inner chassis 42 (in particular, the resin frame) is sometimes called a battery holder.

Figure 4:
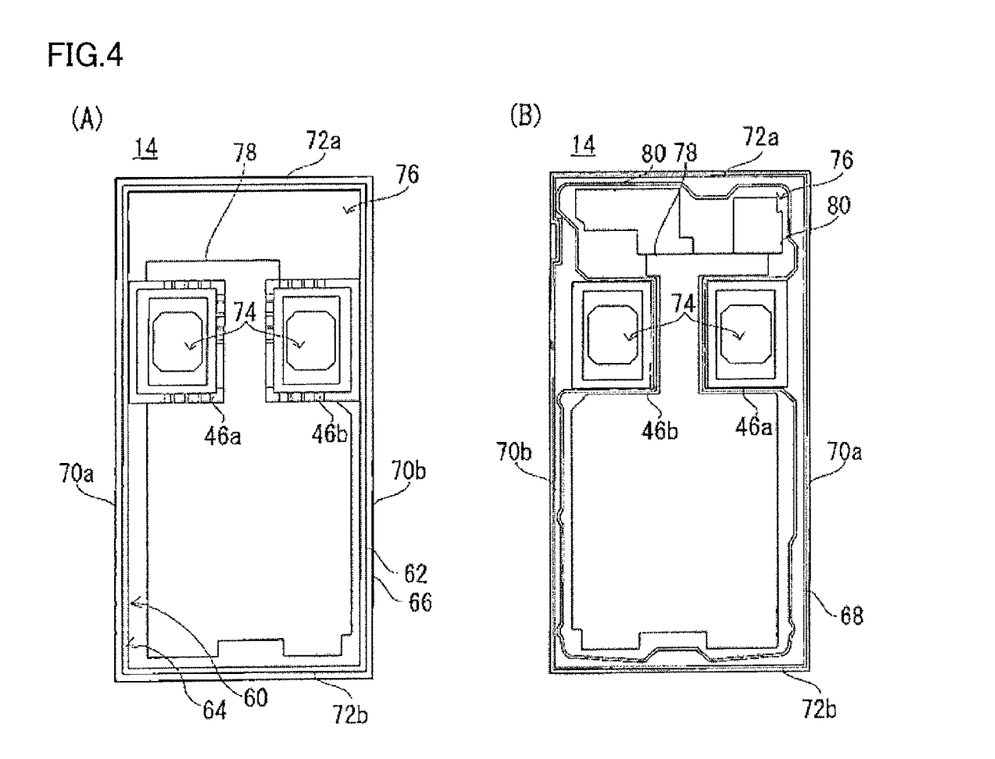
FIG. 4 illustrates an example of the structure of an attachment frame shown in FIGS. 2A and 2B, where (A) shows the attachment frame as seen from the front side, and (B) shows the attachment frame as seen from the back side.

Referring to (A) and (B) in FIG. 4 together with FIG. 3, attachment frame 14 is a flat rectangle similarly to front panel 16 or inner chassis 42. Attachment frame 14 may be a frame including a pair of vertical frames 70 (a first pair of frame members) and a pair of horizontal frames 72 (a second pair of frame members) obtained by resin molding together with respective parts which will be described below. A first vertical frame 70a and a second vertical frame 70b may be located at a predetermined spacing. A first horizontal frame 72a may couple the pair of vertical frames 70 at the upper side, and a second horizontal frame 72*b* may couple the pair of vertical frames 70 at the lower side.

A first speaker holder 46*a* and a second speaker holder 46*b*, both having a plate-like shape, may extend inwardly from the inner sides of first vertical frame 70*a* and second vertical frame 70*b*, respectively, to be opposed to each other. An octagonal second sound hole 74, for example, may be located at the center of each of first speaker holder 46*a* and second speaker holder 46*b* in order to emit sound of first film speaker 30*a* and second film speaker 30*b* held therein. Second sound hole 74 may be defined by inner edge 84 (see FIG. 6).

A rib 90 (see FIGS. 9A and 9B) which will be described later in detail may be located on the periphery of the front surface of each of first speaker holder 46*a* and second speaker holder 46*b*. First speaker holder 46*a* and second speaker holder 46*b* may have a flat rectangular plate-like shape in an embodiment, but are not limited to this shape. Each of first speaker holder 46*a* and second speaker holder 46*b* should just include at least an area to which frame 38 shown in FIGS. 2A and 2B can be affixed with a resin tape 86 (see FIG. 6). Second sound hole 74 may be larger or smaller than that shown in FIG. 4.

Inner chassis 42 is fitted within attachment frame 14. The inner side of the pair of vertical frames 70 and the pair of horizontal frames 72 includes an inner wall 60 (also see FIGS. 6, 8, etc.) where inner chassis 42 can be fitted. Inner wall 60 may come into contact with the outer surface of the resin frame of inner chassis 42 so that inner chassis 42 is fitted into attachment frame 14.

A recess 62 and an inner wall 64 (for both, also see FIGS. 6, 8, etc.) where front panel 16 is to be received and attached may be located on the upper side of attachment frame 14. A portion 66 (also see FIGS. 6, 8, etc.) on the outer side with respect to recess 62 includes an exposed portion exposed as a part of the appearance (FIG. 1) of mobile phone 10. When front panel 16 is attached to the inner side of inner wall 64 and into recess 62, front panel 16 and outer portion 66 may be in an identical or generally identical plane (flush with each other).

A recessed second fitting portion 68 (also see FIGS. 6, 8, etc.) is located on the back side of attachment frame 14. A projecting first fitting portion 58 (also see FIG. 3 etc.) is located on a side surface of back panel 12. When first fitting portion 58 is fitted into second fitting portion 68, back panel 12 may be attached to attachment frame 14.

An assembling portion 76 for assembling components, such as a camera unit, for example, may be located in an area ranging from the inner side of first horizontal frame 72*a* to the upper edges of first speaker holder 46*a* and second speaker holder 46*b*. A rectangular hole 78 through which wires and the like pass may be located in assembling portion 76. On the back side of attachment frame 14 ((B) in FIG. 4), two substrate recesses 80 ((B) in FIG. 4) in which substrate 48 having a shape as shown in FIG. 3 is placed may be located in assembling portion 76. As understood from FIG. 3, a hole 22*a* communicating with the microphone and a hole 26*a* communicating with the charging terminal may be located in the side surface of second horizontal frame 72*b*.

Returning to FIG. 3, substrate 48 is made of resin, glass fibers or the like, and includes an irregular-shaped first portion 50, a generally rectangular second portion 52 and a narrow extended third portion 54 connecting first portion 50 and second portion 52. On substrate 48, predetermined wires may be placed, and necessary components, such as a microphone, may be mounted.

The shape and size of first portion 50, second portion 52 and third portion 54 of substrate 48 are not limited to those of an embodiment.

Coupling member 56 is made of resin or the like, and may include two engaging portions 82 (see FIG. 6) on each of the left and right sides. The inner ends of first speaker holder 46*a* and second speaker holder 46*b* opposed to each other may be coupled to each other by coupling member 56. How to attach them will be described later in detail.

As shown in FIG. 1, back panel 12 which is the main housing member may be made of resin so as to present a shape such as a rectangular box which constitutes the side surfaces and the bottom surface (back surface) of mobile phone 10. First sound holes 24 may be located in the principal surface (bottom surface) of back panel 12. A hole 22*b* communicating with the microphone and a hole 26*b* communicating with the charging terminal may be located in the lower surface of back panel 12.

Inner chassis 42, secondary battery 44, first film speaker 30*a*, second film speaker 30*b*, substrate 48, and coupling member 56 may be located on attachment frame 14. Front panel 16 may be located on the front side of attachment frame 14, and back panel 12 may be located on the back side.

The procedure of attaching components to attachment frame 14 will be described. First, referring to (A) and (B) in FIG. 5, first film speaker 30*a* and second film speaker 30*b* may be arranged such that their front surfaces face first sound holes 24 by means of first speaker holder 46*a* and second speaker holder 46*b*, respectively. Specifically, first film speaker 30*a* and second film speaker 30*b* may be affixed to first speaker holder 46*a* and second speaker holder 46*b*, respectively, with resin tape 86 (see FIGS. 6 and 8) on the front side of attachment frame 14. First film speaker 30*a* and second film speaker 30*b* may be affixed such that their surfaces (front surfaces) from which sound is to be output face corresponding second sound holes 74. Resin tape 86 may bond frame 38 of first film speaker 30*a* and second film speaker 30*b* to first speaker holder 46*a* and second speaker holder 46*b*, respectively. With first film speaker 30*a* and second film speaker 30*b* affixed to first speaker holder 46*a* and second speaker holder 46*b*, respectively, first film speaker 30*a* and second film speaker 30*b* are visible through each of second sound holes 74 from the back side of attachment frame 14.

Figure 5:
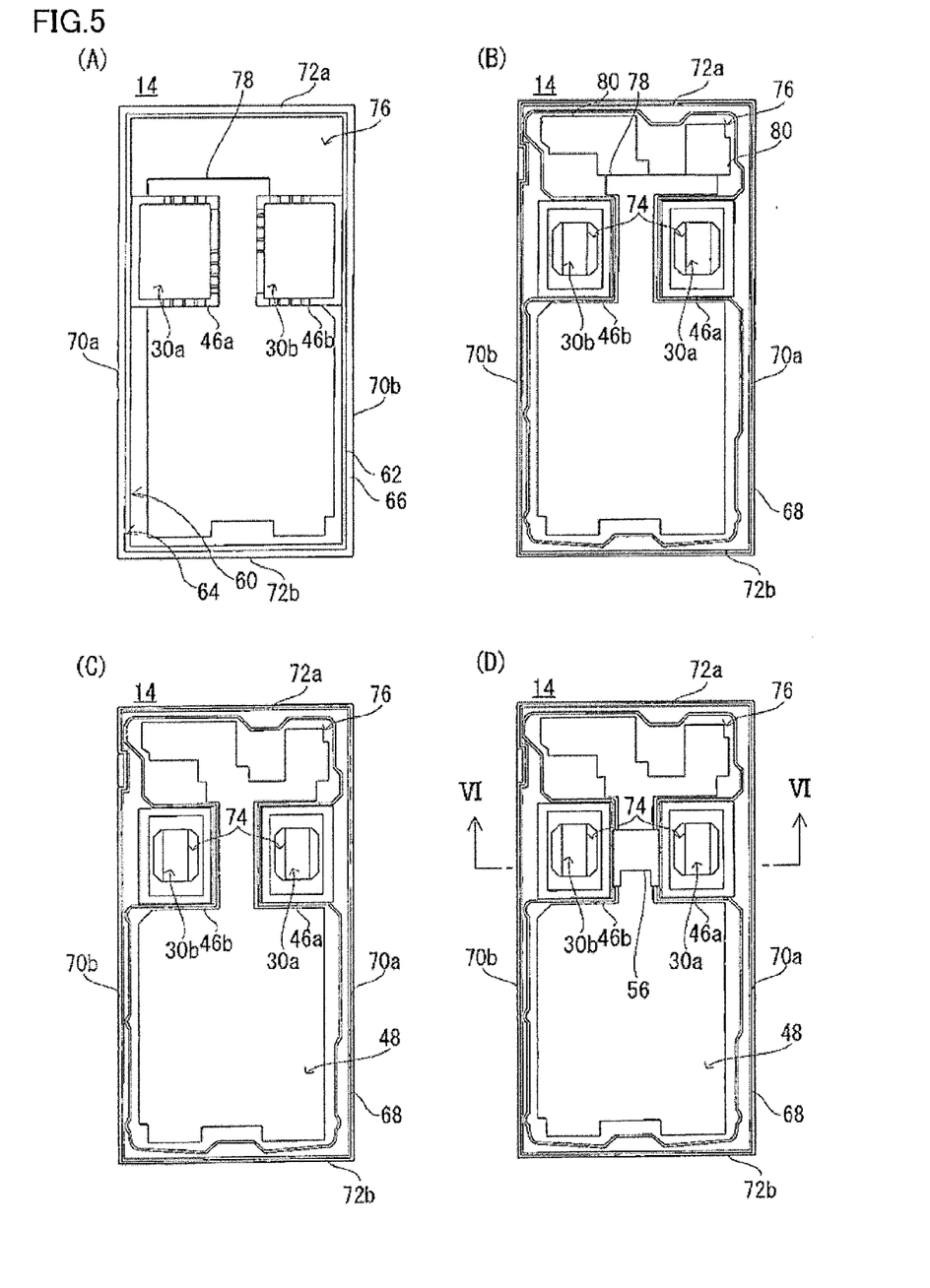
FIG. 5 illustrates an example in which necessary components are located on the attachment frame shown in FIGS. 2A and 2B, where (A) shows the front side of the attachment frame with a first film speaker and a second film speaker affixed thereto, (B) shows the back side of the attachment frame with the first and second film speakers affixed thereto, (C) shows a state in which a substrate is located, and (D) shows a state in which a first speaker holder and a second speaker holder have been coupled at their inner ends opposed to each other by a coupling member.

Referring to (C) and (D) in FIG. 5, substrate 48 is located on the back side of attachment frame 14. First portion 50 may be located above first speaker holder 46*a* and second speaker holder 46*b* so as to overlap a part of attachment portion 76. Second portion 52 may be located below first speaker holder 46*a* and second speaker holder 46*b*. Third portion 54 may be located so as to extend between first speaker holder 46*a* and second speaker holder 46*b* and so as to be generally flush with first film speaker 30*a* and second film speaker 30*b*. Hole 78 and substrate recess 80 located in assembling portion 76 may be hidden by substrate 48. Since substrate 48 is located on the back side of attachment frame 14 so as to avoid first film speaker 30*a* and second film speaker 30*b*, the thicknesses of first film speaker 30*a* and second film speaker 30*b* may be included in the thickness of substrate 48. Since first film speaker 30*a* and second film speaker 30*b* can be located in a plane identical to or generally identical to substrate 48, the thickness can be reduced further. Since third portion 54 connects first portion 50 and second portion 52, and coupling member 56 couples first speaker holder 46*a* and second speaker holder 46*b* straddling third portion 54, first speaker holder 46*a* and second speaker holder 46b having high rigidity can be obtained without reducing the available area of substrate 48.

Next, as shown in FIG. 5 at (D), coupling member 56 may be engaged with first speaker holder 46a and second speaker holder 46b from above third portion 54 of substrate 48 so as to couple the inner ends of first speaker holder 46a and second speaker holder 46b opposed to each other.

Figure 6:
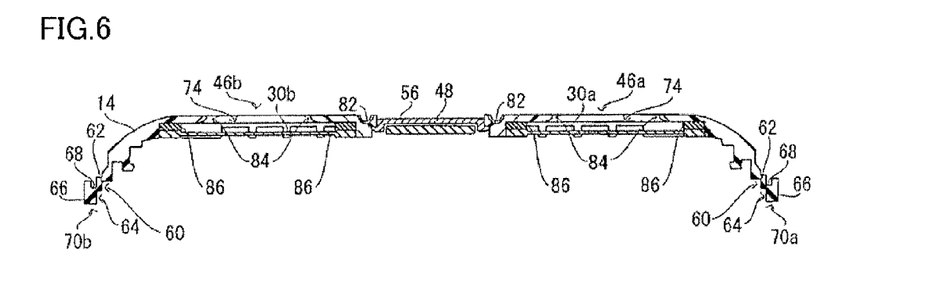
FIG. 6 shows an example of a cross section taken along the line VI-VI shown in FIG. 5 at (D).

In more detail, referring to FIG. 6 showing a cross section taken along the line VI-VI in FIG. 5 at (D), a claw may be located at the leading end of each engaging portion 82. When coupling member 56 is pressed from above on the back side of attachment frame 14, engaging portion 82 may be temporarily bent inwardly. When coupling member 56 is pressed further so that the leading end of engaging portion 82 reaches the front side of attachment frame 14, engaging portion 82 may be returned to its original shape. The claws at the leading ends of engaging portions 82 may be caught at the peripheries of first speaker holder 46a and second speaker holder 46b, and coupling member 56 may be fixed between first speaker holder 46a and second speaker holder 46b.

First speaker holder 46a and second speaker holder 46b may be firmly coupled by coupling member 56 to be changed from a cantilever beam structure (the state shown in FIG. 4, etc.) to a both-ends-supported beam structure. Since first speaker holder 46a and second speaker holder 46b are integral with each other, each of them increases in rigidity. Since vibrations of first speaker holder 46a and second speaker holder 46b themselves are suppressed, first film speaker 30a and second film speaker 30b can be increased in sound pressure level.

When attaching back panel 12 to attachment frame 14, an adhesive may be applied to coupling member 56, and coupling member 56 may be bonded and fixed to back panel 12. First speaker holder 46a and second speaker holder 46b will be reinforced also by back panel 12, so that a further improvement in sound pressure can be expected.

In another embodiment, a recess may be located in coupling member 56 in order to prevent the adhesive applied to coupling member 56 from flowing out.

Figure 7A:
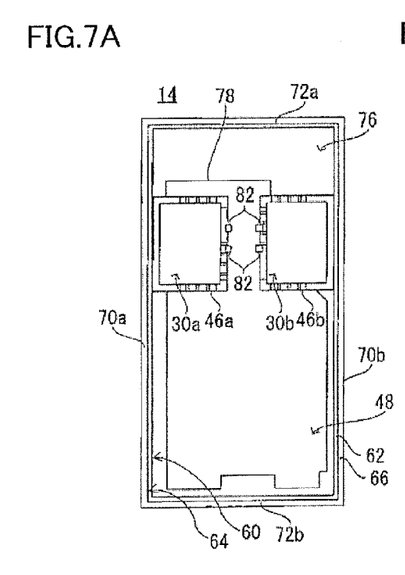
FIG. 7A shows an example of a state before the inner chassis is fitted within the attachment frame shown in FIG. 5 at (D).

FIG. 7A illustrates a state before inner chassis 42 is fitted within the attachment frame shown in FIG. 5 at (D). Substrate 48 is partly visible below hole 78, first speaker holder 46a and second speaker holder 46b. The claws at the leading ends of engaging portions 82 of coupling member 56 may be caught on the right side of first speaker holder 46a and the left side of second speaker holder 46b. As shown in FIG. 7A, coupling member 56 may couple first speaker holder 46a and second speaker holder 46b such that engaging portions 82 are fitted within some of notches 92 of first speaker holder 46a and second speaker holder 46b.

Figure 7B:
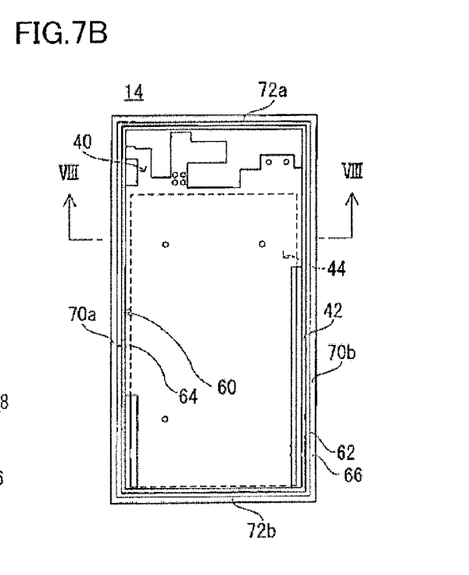
FIG. 7B shows an example of a state in which the inner chassis has been fitted within the attachment frame shown in FIG. 7A.

Referring to FIG. 7B, when inner chassis 42 holding secondary battery 44 is fitted within attachment frame 14, then, substrate 48, first film speaker 30a, second film speaker 30b, first speaker holder 46a, second speaker holder 46b, and the like may be hidden by inner chassis 42. In FIG. 7B, secondary battery 44 is indicated by the dotted line.

Figure 8:
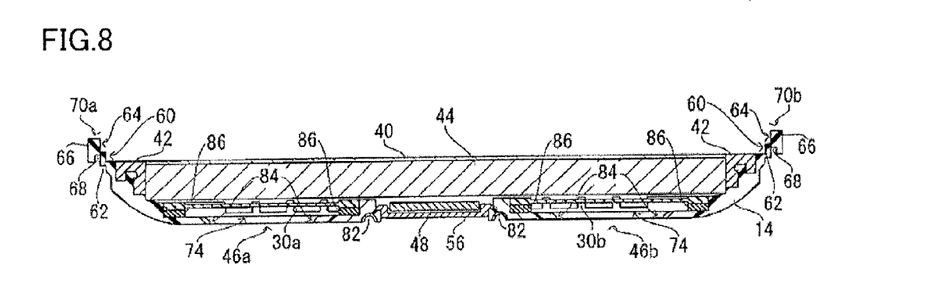
FIG. 8 shows an example of a cross section taken along the line VIII-VIII shown in FIG. 7B.

Referring to FIG. 8 showing a cross section taken along the line VIII-VIII of FIG. 7B, secondary battery 44 may be held by inner chassis 42. Secondary battery 44 is located in attachment frame 14 and shield plate 40, and is therefore unlikely to fall out from inner chassis 42.

First film speaker 30a and second film speaker 30b may be held by first speaker holder 46a and second speaker holder 46b, respectively, on the back side of secondary battery 44. First film speaker 30a and second film speaker 30b may be held stably by first speaker holder 46a and second speaker holder 46b, respectively, on the back side of secondary battery 44.

By employing and placing film speaker 30 on the back side of secondary battery 44, mobile phone 10 can be reduced in thickness as a whole.

As shown in FIG. 8, inner chassis 42 holding secondary battery 44 may be fitted within inner wall 60 of attachment frame 14. The thickness of the frame of inner chassis 42 may include the thicknesses of shield plate 40 and a part of secondary battery 44. The thickness of attachment frame 14 may include the thicknesses of shield plate 40, inner chassis 42 and secondary battery 44. Even if inner chassis 42 with secondary battery 44 fitted therein is fitted into attachment frame 14, the thickness of attachment frame 14 is unlikely to be changed. Even if inner chassis 42 with secondary battery 44 fitted therein is fitted into attachment frame 14, shield plate 40, secondary battery 44 and inner chassis 42 are unlikely to protrude from attachment frame 14 in the thickness direction of attachment frame 14. With such a configuration, mobile phone 10 can also be reduced in thickness as a whole.

Figure 9A:
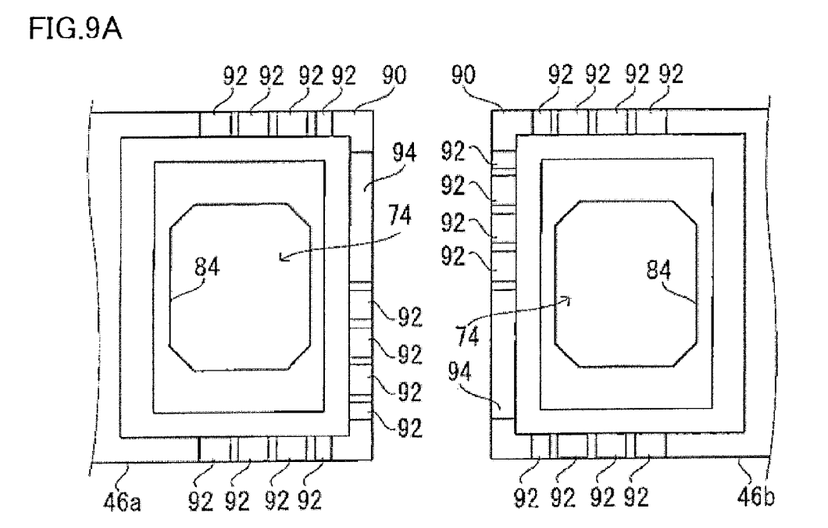
FIGS. 9A and 9B each show an example of an enlarged state of the first and second speaker holders shown in FIG. 4 at (A) as seen from the front side of the attachment frame.
Figure 9B:
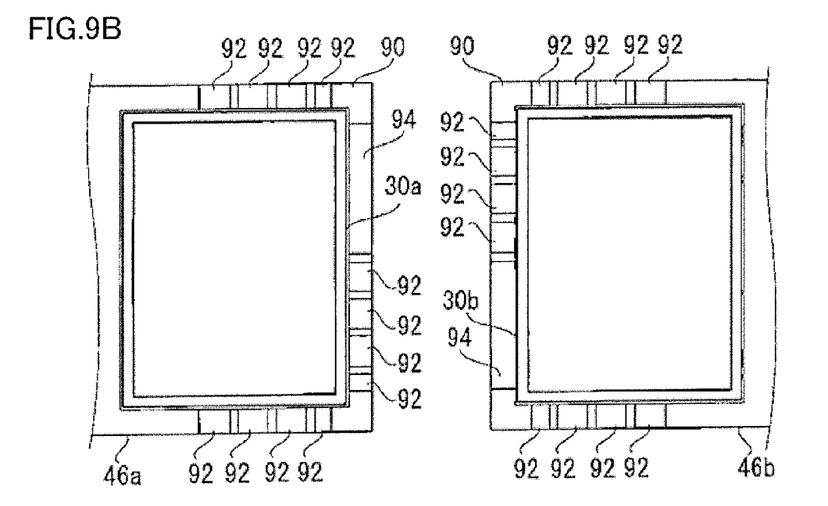

FIGS. 9A and 9B show enlarged views of details of first speaker holder 46a and second speaker holder 46b shown in FIG. 4 at (A). Referring to FIG. 9A, rib 90 may surround the peripheries of first speaker holder 46a and second speaker holder 46b. The height of rib 90 may be set to be higher than the thickness (height) of first film speaker 30a and second film speaker 30b affixed to first speaker holder 46a and second speaker holder 46b, respectively. When first film speaker 30a and second film speaker 30b are affixed to first speaker holder 46a and second speaker holder 46b, respectively, rib 90 may become higher than first film speaker 30a and second film speaker 30b. Rib 90 for first speaker holder 46a may include twelve notches 92 in total, that is, four on the upper side, four on the lower side, and four on the right side. A wiring recess 94 may be located on the right side of rib 90 for first speaker holder 46a in order to let a wire connected to first film speaker 30a pass therethrough. Similarly, rib 90 for second speaker holder 46b may include twelve notches 92 in total, that is, four on the upper side, four on the lower side, and four on the left side, and wiring recess 94 may be located on the left side of rib 90. The number and size (length or width) of notches 92 are not limited to those of an embodiment.

Referring to FIG. 9B, when first film speaker 30a and second film speaker 30b are attached to first speaker holder 46a and second speaker holder 46b, respectively, first speaker holder 46a and second speaker holder 46b can hold first film speaker 30a and second film speaker 30b, respectively, with rib 90 surrounding first film speaker 30a and second film speaker 30b.

Figure 10:
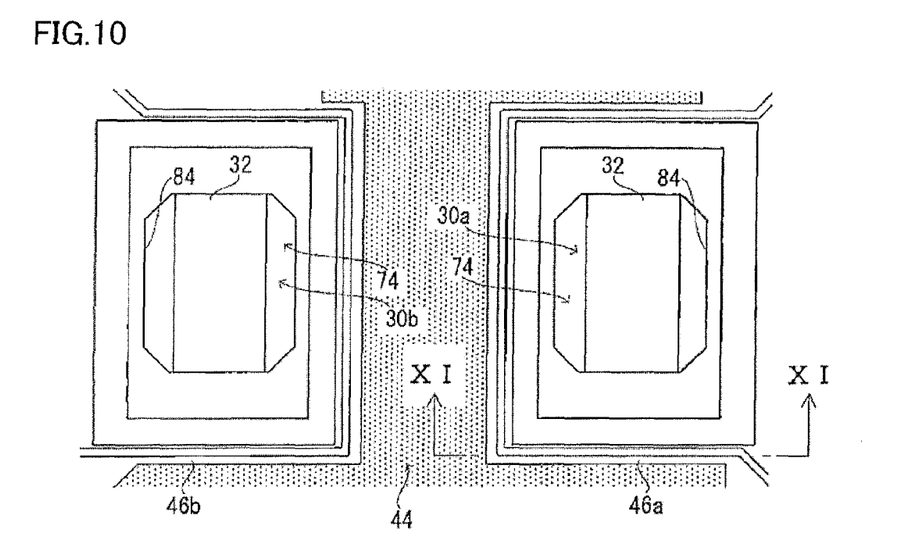
FIG. 10 illustrates an example of a state in which the first and second speaker holders shown in FIG. 9B are seen from the back side and in which a secondary battery is located on the front side of the attachment frame.

FIG. 10 illustrates an example of a state in which first speaker holder 46a and second speaker holder 46b shown in FIG. 9B are seen from the back side and in which secondary battery 44 is located on the front side of attachment frame 14. Piezoelectric elements 32 of first film speaker 30a and second film speaker 30b are partly visible through second sound holes 74 of first speaker holder 46a and second speaker holder 46b. First film speaker 30a and second film speaker 30b may be located on the back side of secondary battery 44.

Figure 11:
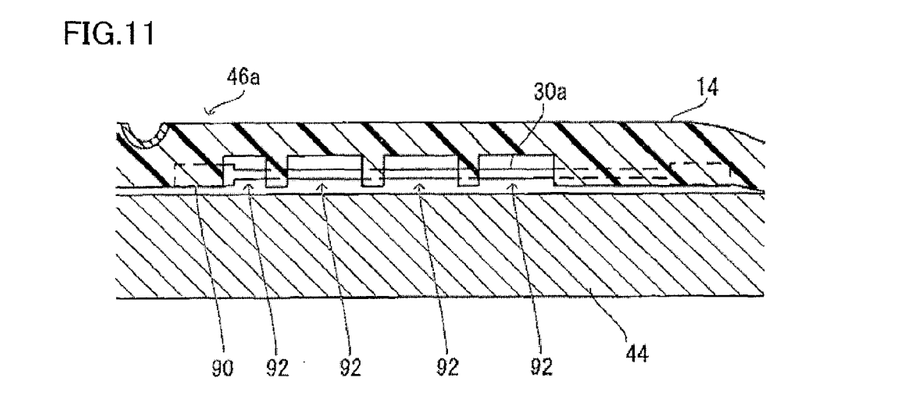
FIG. 11 shows an example of a cross section taken along the line XI-XI shown in FIG. 10.

FIG. 11 is a cross section taken along the line XI-XI shown in FIG. 10, and mainly shows a cross section of rib 90 for first speaker holder 46a holding first film speaker 30a. Referring to FIG. 11, the upper end surface (the lower side in FIG. 11) of rib 90 may be opposed to the back surface of secondary battery 44. Since rib 90 may be higher than first film speaker 30a being held, first film speaker 30a may be hidden by rib 90 almost entirely in this cross section. Rib 90 may be partly visible through notches 92. Since the upper end surface of rib 90 higher than first film speaker 30a may face secondary battery 44, a gap may be ensured between secondary battery 44 and first film speaker 30a. Even if secondary battery 44 is expanded with time by repeated charging and discharging, the principal surface of secondary battery 44 cannot be displaced further toward first film speaker 30a because rib 90 functions as a stopper and the upper end surface of rib 90 contacts the principal surface of expanded secondary battery 44. The gap between first film speaker 30a and secondary battery 44 may be stably ensured by rib 90.

Even if first film speaker 30a is surrounded by rib 90, the inner side and the outer side of rib 90 surrounding first film speaker 30a and second film speaker 30b communicate with each other through notches 92. The back side capacity of first film speaker 30a can thus be ensured sufficiently, and first film speaker 30a can be improved in acoustic performance.

Since the upper and left sides of rib 90 for first speaker holder 46a, rib 90 for second speaker holder 46b and second film speaker 30b are substantially the same as those shown in FIG. 11, a detailed illustration will not be given.

In another embodiment, in order to further improve the sound pressure level of first film speaker 30a, rib 90 of first speaker holder 46a may be fixed (bonded) to secondary battery 44 by a fixing member or fixing means, such as an adhesive. Secondary battery 44 having the maximum weight and the highest rigidity in mobile phone 10 of an embodiment may be used to fix first speaker holder 46a onto secondary battery 44. In another embodiment, a double-faced tape, a fitting (engagement) mechanism or the like may be used to fix rib 90 to secondary battery 44.

Figure 12A:
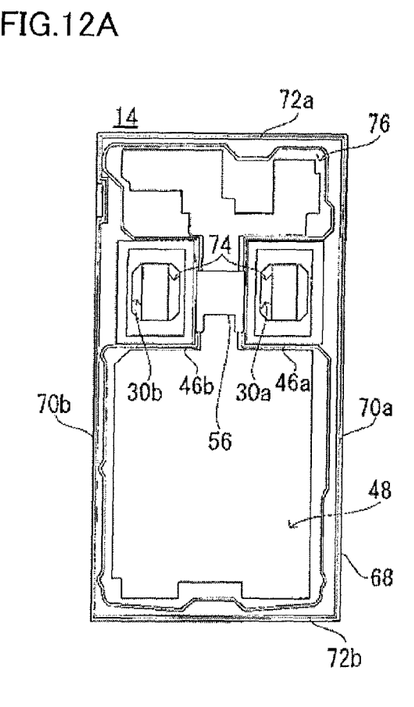
FIG. 12A shows an example of a state before a back panel is attached to the attachment frame shown in FIG. 7B as seen from the back side.

FIG. 12A illustrates a state in which attachment frame 14 shown in FIG. 7B is seen from the back side before back panel 12 is attached thereto. Inner chassis 42, secondary battery 44 and the like attached to the front side of attachment frame 14 may be hidden by first speaker holder 46a, second speaker holder 46b, substrate 48, the pair of vertical frames 70, the pair of horizontal frames 72, assembling portion 76, and the like.

Figure 12B:
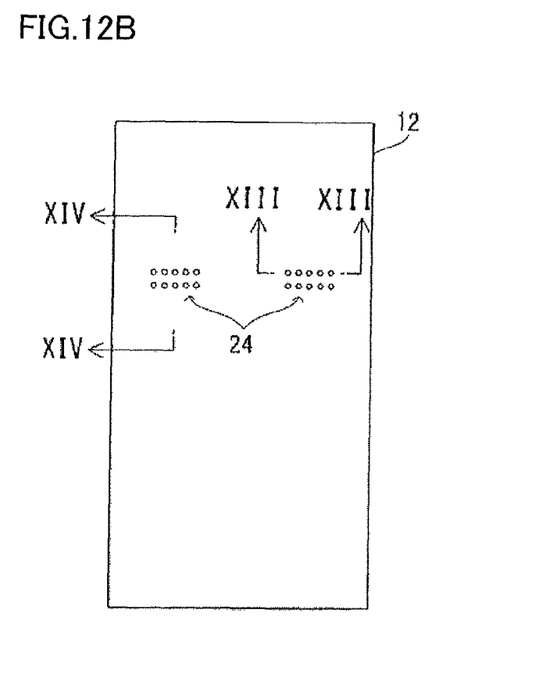
FIG. 12B shows an example of a state in which the back panel has been attached to the attachment frame shown in FIG. 12A.

Referring to FIG. 12B, after back panel 12 is attached to attachment frame 14, first film speaker 30a, second film speaker 30b, first speaker holder 46a, second speaker holder 46b, substrate 48, coupling member 56, fitting portion 68, the pair of vertical frames 70, the pair of horizontal frames 72, second sound holes 74, and assembling portion 76 may be hidden by back panel 12.

Figure 13:
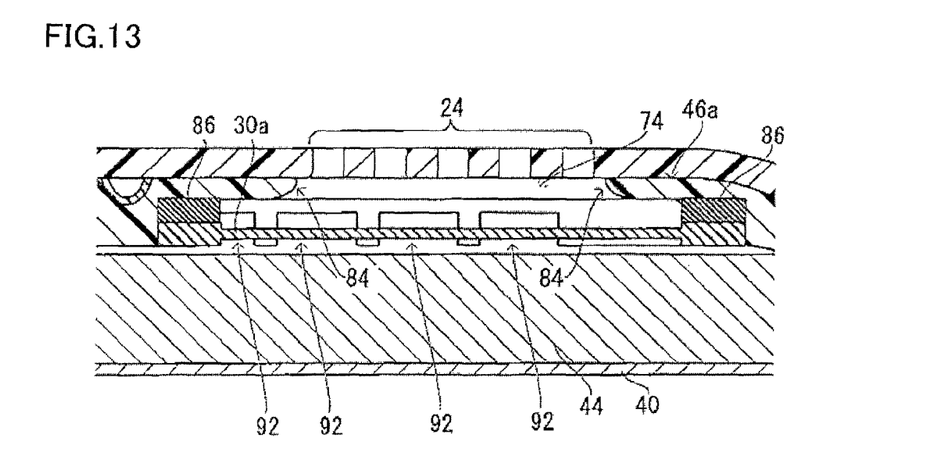
FIG. 13 shows an example of a cross section taken along the line XIII-XIII shown in FIG. 12B.

FIG. 13 is a cross section taken along the line XIII-XIII shown in FIG. 12B. When back panel 12 is attached to attachment frame 14, back panel 12 may be in generally close contact with attachment frame 14. In this state, second sound holes 74 correspond to first sound holes 24, and are located between first sound holes 24 and first film speaker 30a. Inner edge 84 extends above first film speaker 30a. A surface of inner edge 84 facing first film speaker 30a may be inclined such that inner edge 84 decreases in thickness toward the leading end of inner edge 84.

Figure 14:
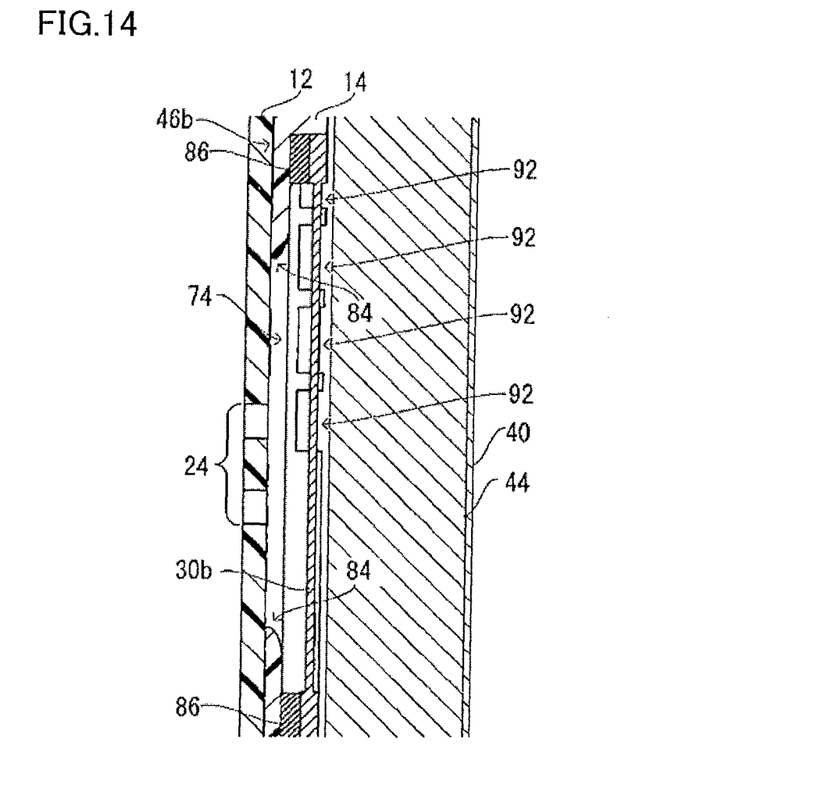
FIG. 14 shows an example of a cross section taken along the line XIV-XIV shown in FIG. 12B.

FIG. 14 is a section taken along the line XIV-XIV shown in FIG. 12B. FIG. 14 is a vertical sectional view of and around second sound holes 74 while FIG. 13 is a cross sectional view of and around second sound holes 74. In the vertical sectional view, inner edge 84 may also extend above first film speaker 30a, and the surface of inner edge 84 facing first film speaker 30a may be inclined such that inner edge 84 decreases in thickness toward the leading end of inner edge 84, similarly to the cross sectional view. Since the neighborhood of second film speaker 30b is generally the same as that of first film speaker 30a, a detailed illustration will not be given.

By extending inner edge 84 of second sound holes 74 above film speaker 30, back panel 12 when deformed is unlikely to make direct contact with film speaker 30. Inner edge 84 of second sound holes 74 extending above film speaker 30 can protect film speaker 30 against back panel 12 when deformed.

Even if inner edge 84 of second sound hole 74 is deformed toward film speaker 30 under the influence of deformed back panel 12 when a load is applied to the neighborhood of first sound hole 24 of back panel 12, film speaker 30 can be less likely to be broken by inner edge 84 because the leading end of inner edge 84 is inclined.

In an embodiment, when film speaker 30 is employed to reduce the entire thickness of mobile phone 10, internal film speaker 30 can be less likely to be broken by a load applied to back panel 12.

Figure 15:
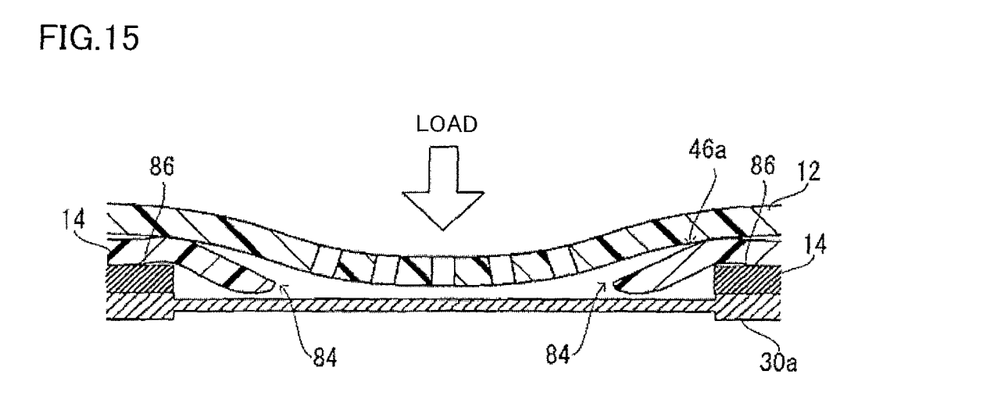
FIG. 15 illustrates an example of how the back panel and the attachment frame are deformed when a load is applied to the back panel shown in FIG. 13.

Referring to FIG. 15, for example, when a load is applied to the neighborhood of first sound hole 24, the bottom surface of back panel 12 may be curved toward the inner side of mobile phone 10, and inner edge 84 of second sound hole 74 may also be deformed (bent) toward first film speaker 30a under the influence of the deformation of back panel 12. Although the surface of inner edge 84 facing first film speaker 30a approaches first film speaker 30a, inner edge 84 is unlikely to make contact with first film speaker 30a because the surface of inner edge 84 facing first film speaker 30a is inclined such that inner edge 84 decreases in thickness toward the leading end of inner edge 84.

For example, when the leading end of inner edge 84 is angular rather than being inclined, the leading end (corner) of inner edge 84 will make contact with first film speaker 30a if inner edge 84 is bent, so that first film speaker 30a may be highly likely to be broken.

In an embodiment, the leading end of inner edge 84 is inclined so as to have a thickness. The rigidity around second sound hole 74 can thus be increased to reduce the influence on inner edge 84 caused by deformation of back panel 12. By increasing the rigidity around second sound hole 74, inner edge 84 will become unlikely to be bent, so that film speaker 30 may be even less likely to be broken.

The thickness of the leading end of inner edge 84 may also ensure the strength of the leading end of inner edge 84. For example, when inner edge 84 is inclined such that the leading end makes an acute angle, the leading end of inner edge 84 may be highly likely to be broken when inner edge 84 is bent. In an embodiment, the leading end of inner edge 84 having a thickness may be prevented from being broken.

Figure 16A:
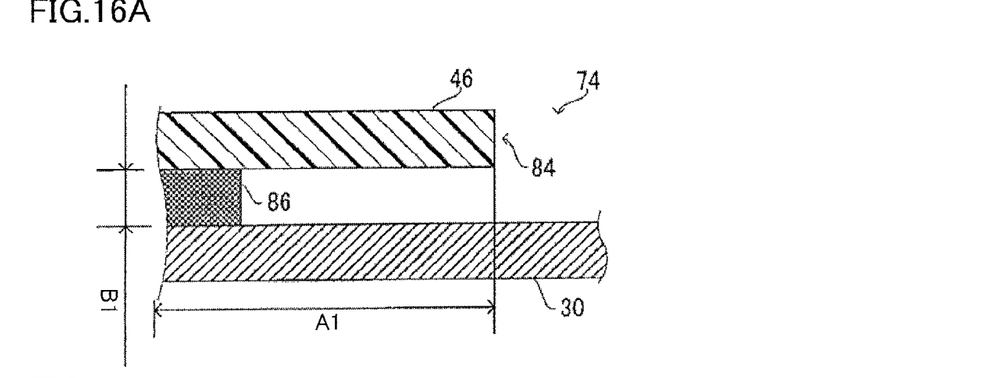
FIG. 16A illustrates an example of how to obtain an angle when inclining an inner edge, showing an example of a film speaker, a second sound hole and a resin tape shown schematically.

Referring to FIGS. 16A to 16D, conditions when inclining the leading end of inner edge 84 of second sound hole 74 will be described. First, FIGS. 16A to 16D schematically show film speaker 30, inner edge 84 of second sound hole 74 and resin tape 86. As shown in FIG. 16A, assume that the length from an end of film speaker 30 to inner edge 84 is a first length A1, and the length from film speaker 30 to second sound hole 74 is a second length B1.

Figure 16B:
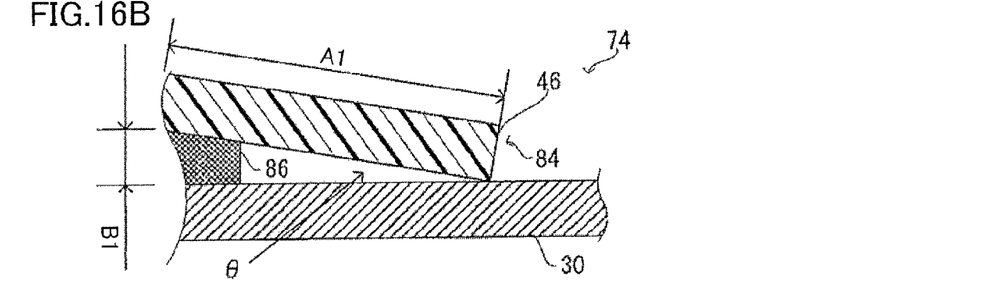
FIG. 16B illustrates an example of how to obtain an angle when inclining the inner edge, showing an example of an angle obtained based on a first length and a second length.

As shown in FIG. 16B, where the leading end of inner edge 84 is in contact with film speaker 30, first length A1 may be an inclined side of a right-angle triangle, and second length B1 may be the height of the right-angle triangle. An angle θ of the right-angle triangle can be calculated based on the expression shown as Ex. 1.

$$\theta = \sin^{-1}(B1/A1) \qquad [\text{Ex. 1}]$$

Figure 16C:
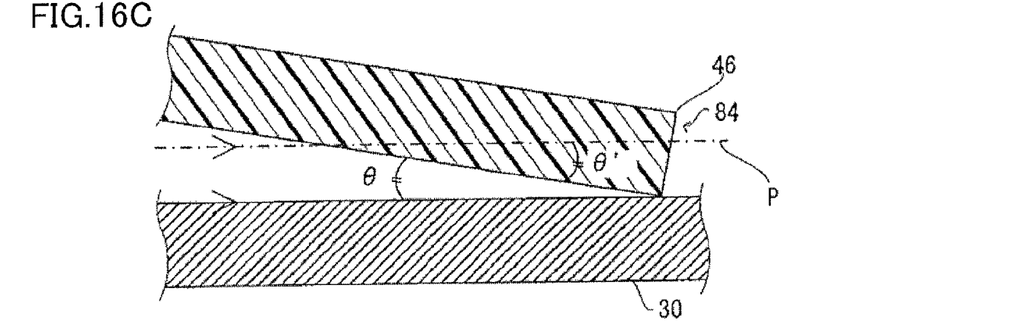
FIG. 16C illustrates an example of how to obtain an angle when inclining the inner edge, showing alternate angles of the angle shown in FIG. 16B.

Next, as shown in FIG. 16C, when a surface P is defined in parallel to the front surface of film speaker 30 paying attention to the neighborhood of the leading end of inner edge 84, the surface of second sound hole 74 facing film speaker 30 may also intersect surface P. An angle θ' defined by surface P and the surface of second sound hole 74 facing film speaker 30 is an alternate angle of angle θ, and angles θ and θ' may have the same value.

Figure 16D:
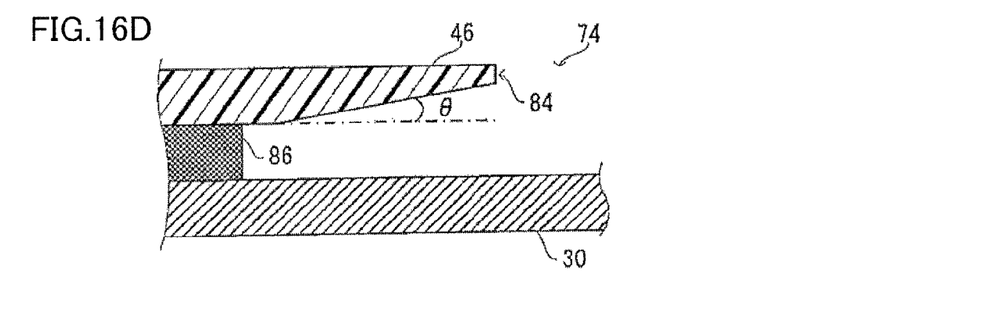
FIG. 16D illustrates an example of how to obtain an angle when inclining the inner edge, showing an example of the inner edge obtained based on the angles shown in FIG. 16C.

As shown in FIG. 16D, if the surface of inner edge 84 of second sound hole 74 facing film speaker 30 is inclined toward the leading end based on angle θ thus obtained, inner edge 84 may be less likely to come into contact with film speaker 30 even if inner edge 84 of second sound hole 74 is deformed. By setting angle θ within a range in accordance with Ex. 2, film speaker 30 can be less likely to be broken.

$$90°>\theta>\sin^{-1}(B1/A1) \qquad [\text{Ex. 2}]$$

Angle θ shown in FIG. 16D may be obtained by a simulation. Although complicated calculations are required for calculating angle θ by a simulation, angle θ (condition) when inclining the leading end of inner edge 84 can be easily calculated by using first length A1 and second length B1 as described above.

First length A1 and second length B1 of another embodiment may be different from those of the above-described embodiment. In another embodiment, angle θ is calculated based on first length A1 and second length B1 different from those of the above-described embodiment.

In an embodiment, the surface of inner edge 84 facing first film speaker 30a may be inclined along the entire circumference such that inner edge 84 decreases in thickness toward the leading end of inner edge 84. In such a case, inner edge 84 may be based on angle θ corresponding to inner edge 84 in a portion for which conditions are most severe. For example, inner edge 84 is more likely to be bent as first length A1 is longer. The above-described "portion for which conditions are most severe" may be a portion where first length A1 is the longest.

For example, as shown in FIG. 10, the value of first length A1 differs between the longitudinal direction and the horizontal direction of inner edge 84, and first length A1 in the longitudinal direction may be longer. In this case, angle θ is obtained from first length A1 and second length B1 in the longitudinal direction. Based on angle θ thus obtained, the surface of inner edge 84 facing first film speaker 30a may be inclined along the entire circumference such that inner edge 84 decreases in thickness toward the leading end of inner edge 84.

In another embodiment, at least a part of inner edge 84 may be inclined. For example, film speaker 30 is likely to be broken when a force is applied to piezoelectric element 32. Film speaker 30 can be less likely to be broken if the surface of inner edge 84 is inclined such that a part of inner edge 84 facing piezoelectric element 32 decreases in thickness toward the leading end of inner edge 84.

For example, since a longitudinal part of inner edge 84 faces piezoelectric element 32 in an embodiment, the surface of inner edge 84 facing first film speaker 30a may be inclined such that the longitudinal part of inner edge 84 decreases in thickness toward the leading end of inner edge 84. The range where inner edge 84 of second sound hole 74 is inclined can be minimized.

The state expressed as being "inclined" in an embodiment also includes a state in which the inclined part is curved.

Attachment frame 14 including inner edge 84 of second sound hole 74 of the above-described embodiment has been formed with a mold. In another embodiment, the leading end of inner edge 84 may be formed into a rectangular shape, and then may be inclined by post-processing, such as polishing or cutting. In still another embodiment, a C surface may be located at the leading end of inner edge 84 at the surface facing first film speaker 30a.

In still another embodiment, angle θ may be obtained considering not only first length A1 and second length B1 but also the material, thickness and the like of back panel 12.

The shape of second sound hole 74 is not limited to circle or rectangle, but may have various shapes in another embodiment.

In the above-described embodiment, back panel 12 includes roundish corners, that is, the side surfaces are inclined or curved with respect to the principal surface of back panel 12. In another embodiment, back panel 12 may have an angled box-like shape (a shape having side surfaces orthogonal to the principal surface).

In the above-described embodiment, back panel 12 serves as the principal surface and side surfaces of the housing member. Back panel 12 may only serve as the principal surface, and attachment frame 14, for example, rather than back panel 12, may serve as the side surfaces.

In the above-described embodiment, substrate 48 includes first portion 50, second portion 52 and third portion 54, but can be variously modified in shape.

For example, substrate 48 may be a single large rectangular substrate, and may be located under attachment frame 14 so as to overlap attachment frame 14. Reduction in thickness by the thickness of substrate 48 being included in the thicknesses of first film speaker 30a and second film speaker 30b cannot be expected. It is not necessary to locate first speaker holder 46a and second speaker holder 46b separately. Even without using coupling member 56, first speaker holder 46a and second speaker holder 46b can be brought into a both-ends-supported structure to increase rigidity.

The substrate may only correspond to first portion 50. First speaker holder 46a and second speaker holder 46b can be originally integral with each other without using coupling member 56.

In the above-described embodiment, first film speaker 30a, second film speaker 30b and rib 90 each have a rectangular shape. In another embodiment, the film speakers (first film speaker 30a and second film speaker 30b) and/or rib 90 are not limited to rectangle, but may have a roundish or another shape.

In the above-described embodiment, rib 90 surrounds first film speaker 30a and second film speaker 30b along the entire circumference. In another embodiment, there may be rib 90 corresponding to at least one side of each of first film speaker 30a and second film speaker 30b. Rib 90 does not need to surround first film speaker 30a and second film speaker 30b.

In the above-described embodiment, two film speakers 30a and 30b are used. For further size reduction of the mobile terminal or further increase of the internal space, only a single film speaker 30 may be adopted.

All the specific numerical values mentioned in the present specification are mere examples, and can be varied as appropriate depending on changes to product specifications or the like.

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. A mobile terminal comprising:
   a housing member with a first sound hole;
   a film speaker including a piezoelectric element and a resin film configured to vibrate with the piezoelectric element; and
   a speaker holder with a second sound hole, the film speaker being located on the speaker holder, the second sound hole corresponding to the first sound hole and being located between the first sound hole and the film speaker,
   an inner edge which defines the second sound hole extending above the film speaker, a surface of the inner edge facing the film speaker being inclined such that at least a part of the inner edge decreases in thickness toward a leading end of the inner edge.

2. The mobile terminal according to claim 1, wherein the surface of the inner edge facing the film speaker is inclined such that a part of the inner edge facing the piezoelectric element decreases in thickness toward the leading end of the inner edge.

3. The mobile terminal according to claim 1, wherein, the surface of the inner edge facing the film speaker is inclined based on a first length from an end of the film speaker to the leading end of the inner edge and a second length from the film speaker to the second sound hole such that the inner edge decreases in thickness toward the leading end of the inner edge.

4. A mobile terminal comprising:
   a housing member with a first sound hole;
   a speaker holder including
      a second sound hole communicating with the first sound hole,
      a surface facing the housing member, and
      an inner side surrounding the second sound hole, being inclined with respect to the surface, and having a varying thickness in a direction perpendicular to the surface; and
   a film speaker located on the speaker holder and facing the housing member, the film speaker including
      a piezoelectric element configured to vibrate; and
      a resin film.

5. A mobile terminal comprising:
   a housing member with one or more first sound holes;
   a speaker holder including
      a first surface,
      a second surface opposite to the first surface, the first surface being closer to the housing member relative to the second surface; and
      a second sound hole extending through the speaker holder from the first surface to the second surface, the second sound hole having
         a first length at the first surface, and
         a second length at the second surface, the second length being larger than the first length;
   a film speaker disposed on the speaker holder, the film speaker including
      a piezoelectric element configured to vibrate; and
      a resin film.

6. The mobile terminal according to claim 5, wherein the film speaker and the first sound hole sandwich the second hole.

7. The mobile terminal according to claim 5, wherein the one or more first sound holes are in direct communication with the second sound hole.

8. The mobile terminal according to claim 5, wherein the film speaker faces the housing member.

* * * * *